(12) United States Patent
Jung

(10) Patent No.: US 12,465,291 B2
(45) Date of Patent: Nov. 11, 2025

(54) ELECTRONIC DEVICE ADJUSTING OXYGEN SATURATION AND METHOD FOR CONTROLLING THE SAME

(71) Applicant: SAMSUNG ELECTRONICS CO., LTD., Suwon-si (KR)

(72) Inventor: Hyunjun Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 712 days.

(21) Appl. No.: 17/809,495

(22) Filed: Jun. 28, 2022

(65) Prior Publication Data

US 2023/0053252 A1 Feb. 16, 2023

Related U.S. Application Data

(63) Continuation of application No. PCT/KR2022/007349, filed on May 24, 2022.

(30) Foreign Application Priority Data

Aug. 11, 2021 (KR) .................. 10-2021-0105812
Mar. 17, 2022 (KR) .................. 10-2022-0033113

(51) Int. Cl.
*A61B 5/1455* (2006.01)
*A61B 5/00* (2006.01)
*A61B 5/11* (2006.01)

(52) U.S. Cl.
CPC .......... *A61B 5/721* (2013.01); *A61B 5/1113* (2013.01); *A61B 5/14551* (2013.01); *A61B 5/4561* (2013.01)

(58) Field of Classification Search
CPC ... A61B 5/1455; A61B 5/14551; A61B 5/721; A61B 5/1113; A61B 5/4561
See application file for complete search history.

(56) References Cited

U.S. PATENT DOCUMENTS

| | | | |
|---|---|---|---|
| 9,339,236 B2 * | 5/2016 | Frix | A61B 5/14551 |
| 11,006,899 B2 | 5/2021 | Olivier et al. | |
| 2003/0236647 A1 | 12/2003 | Yoon et al. | |
| 2005/0107722 A1 * | 5/2005 | Ozaki | A61B 5/113 |
| | | | 600/587 |

(Continued)

FOREIGN PATENT DOCUMENTS

| | | |
|---|---|---|
| EP | 2229880 A1 | 9/2010 |
| JP | 2007190281 A | 8/2007 |

(Continued)

OTHER PUBLICATIONS

International Search Report and Written Opinion of the International Searching Authority dated Aug. 29, 2022, in connection with International Application No. PCT/KR2022/007349, 9 pages.

(Continued)

*Primary Examiner* — Eric F Winakur

(57) ABSTRACT

According to an embodiment, an electronic device may include a first sensor configured to detect a movement, a second sensor configured to measure an oxygen saturation, a memory, and at least one processor operatively connected to the first sensor, the second sensor, and the memory, and the at least one processor is configured to identify whether a period in which a posture is maintained before a movement is detected is greater than or equal to a predetermined period based on a movement greater than or equal to a predetermined value being detected via the first sensor, to identify an oxygen saturation reference value stored in the memory based on the period in which the posture is maintained before the movement is detected being greater than or equal to the predetermined period, and to adjust, based on the oxygen saturation reference value, an oxygen saturation value obtained via the second sensor during the period in which the posture is maintained before the movement is detected.

20 Claims, 11 Drawing Sheets

(56) References Cited

U.S. PATENT DOCUMENTS

| | | | |
|---|---|---|---|
| 2005/0222502 A1 | 10/2005 | Cooper | |
| 2006/0173257 A1 | 8/2006 | Nagai et al. | |
| 2006/0217603 A1 | 9/2006 | Nagai et al. | |
| 2011/0046462 A1 | 2/2011 | Ono et al. | |
| 2017/0181680 A1 | 6/2017 | Baek et al. | |
| 2018/0132789 A1* | 5/2018 | Chen | A61B 5/1455 |
| 2019/0076085 A1 | 3/2019 | Woo et al. | |
| 2019/0290175 A1 | 9/2019 | Umekawa et al. | |
| 2020/0000388 A1 | 1/2020 | Hong et al. | |
| 2020/0163794 A1 | 5/2020 | Goff et al. | |
| 2021/0085191 A1 | 3/2021 | Degtyarenko et al. | |
| 2022/0218293 A1* | 7/2022 | Chou | A61B 5/7282 |

FOREIGN PATENT DOCUMENTS

| | | |
|---|---|---|
| JP | 2016059736 A | 4/2016 |
| JP | 2019166151 A | 10/2019 |
| JP | 2020174972 A | 10/2020 |
| KR | 10-2003-0075225 A1 | 9/2003 |
| KR | 20110000797 A | 1/2011 |
| KR | 20170076329 A | 7/2017 |
| KR | 20170108462 A | 9/2017 |
| KR | 10-1995153 B1 | 7/2019 |
| KR | 10-2020-0003540 A | 1/2020 |
| KR | 20200043740 A | 4/2020 |
| KR | 10-2021-0034724 A | 3/2021 |
| WO | 2020178346 A1 | 9/2020 |

OTHER PUBLICATIONS

Supplementary European Search Report dated Jul. 30, 2024, in connection with European Patent Application No. 22855974.6, 7 pages.

* cited by examiner

FIG. 9A

| | | | | | | t1 | | | | | | | | | | | | | |
|---|---|---|---|---|---|---|---|---|---|---|---|---|---|---|---|---|---|---|---|
| Posture index | 10 | 10 | 10 | 10 | 11 | 11 | | | | | | | | | | | | | |
| Measured SpO2 | 95 | 95 | 95 | 95 | 95 | 95 | | | | | | | | | | | | | |
| Adjusted SpO2 | 93 | 93 | 93 | 93 | | | | | | | | | | | | | | | |

| | | | | | | t1 | | | | | | | | | | | | | |
|---|---|---|---|---|---|---|---|---|---|---|---|---|---|---|---|---|---|---|---|
| Posture index | 10 | 10 | 10 | 10 | 11 | 11 | 12 | | | | | | | | | | | | |
| Measured SpO2 | 95 | 95 | 95 | 95 | 95 | 95 | 80 | | | | | | | | | | | | |
| Adjusted SpO2 | 93 | 93 | 93 | 93 | X | X | | | | | | | | | | | | | |

| | | | | | | | | | | | | t2 | | | | | | | |
|---|---|---|---|---|---|---|---|---|---|---|---|---|---|---|---|---|---|---|---|
| Posture index | 10 | 10 | 10 | 10 | 11 | 11 | 12 | 12 | 12 | 12 | 12 | 12 | 12 | | | | | | |
| Measured SpO2 | 95 | 95 | 95 | 95 | 95 | 95 | 80 | 80 | 80 | 80 | 80 | 80 | 80 | | | | | | |
| Adjusted SpO2 | 93 | 93 | 93 | 93 | X | X | | | | | | | | | | | | | |

| | | | | | | | | | | | | | | | | | | t3 | |
|---|---|---|---|---|---|---|---|---|---|---|---|---|---|---|---|---|---|---|---|
| Posture index | 10 | 10 | 10 | 10 | 11 | 11 | 12 | 12 | 12 | 12 | 12 | 12 | 12 | 12 | 12 | 12 | 12 | 12 | 13 |
| Measured SpO2 | 95 | 95 | 95 | 95 | 95 | 95 | 80 | 80 | 80 | 80 | 80 | 80 | 80 | 75 | 80 | 80 | 75 | 80 | 94 |
| Adjusted SpO2 | 93 | 93 | 93 | 93 | X | X | | | | | | | | | | | | | |

| | | | | | | | | | | | | | | | | | | t3 | |
|---|---|---|---|---|---|---|---|---|---|---|---|---|---|---|---|---|---|---|---|
| Posture index | 10 | 10 | 10 | 10 | 11 | 11 | 12 | 12 | 12 | 12 | 12 | 12 | 12 | 12 | 12 | 12 | 12 | 12 | 13 |
| Measured SpO2 | 95 | 95 | 95 | 95 | 95 | 95 | 80 | 80 | 80 | 80 | 80 | 80 | 80 | 75 | 80 | 80 | 75 | 80 | 94 |
| Adjusted SpO2 | 93 | 93 | 93 | 93 | X | X | 93 | 93 | 93 | 93 | 93 | 93 | 93 | 88 | 93 | 93 | 88 | 93 | |

950

ELECTRONIC DEVICE ADJUSTING OXYGEN SATURATION AND METHOD FOR CONTROLLING THE SAME

CROSS-REFERENCE TO RELATED APPLICATIONS

This application is a bypass continuation of PCT International Application No. PCT/KR2022/007349, which was filed on May 24, 2022, and which is based on and claims priority to Korean Patent Application No. 10-2021-0105812, filed on Aug. 11, 2021, and to Korean Patent Application No. 10-2022-0033113, filed on Mar. 17, 2022, in the Korean Intellectual Property Office, the disclosures of which are incorporated by reference herein in their entireties.

BACKGROUND

1. Field

Embodiments of the disclosure relate to an electronic device that adjusts an oxygen saturation and a control method thereof.

2. Description of Related Art

User concerns about health issues have increased and technology that enables a user to measure biometric signals via an electronic device has been developed.

For example, an electrocardiogram, a blood pressure, a pulse, a respiration rate, a temperature, and an oxygen saturation are capable of being measured via a sensor included in such electronic device.

Pulse oximetry is a useful method capable of measuring an oxygen saturation in a non-invasive manner, which measures an oxygen saturation using the rate of light absorbance of arterial blood, the amount of which is temporarily increased due to cardiac output, in two wavelengths (RED and infrared).

Pulse oximetry has an advantage in that it is a non-invasive method and is contained in an electronic device (e.g., a wearable device) that is in contact with a body part of a user.

SUMMARY

Most wearable devices contain a pulse oximetry function, and a sensor that supports a pulse oximetry function contained in a wearable device may be provided in a reflective structure.

Unlike a transmissive-type pulse oximetry device which is a medical device, a reflective-type pulse oximetry device may have many erroneous factors occurring when an oxygen saturation is measured such as the difference in paths between two wavelengths (RED, Infrared), an optical shunt, or the like.

Particularly, in order to stably measure an oxygen saturation, a posture needs to be stably maintained. However, a person may find it difficult to maintain a stable posture during sleep, and tossing and turning in bed may cause a pressure on a predetermined part, or an optical short circuit may occur due to a relative location between the heart organ and a location of measurement or the gap between a body part and a sensor (e.g., a pulse oximetry measurement sensor). Accordingly, a measured oxygen saturation may include an error.

The disclosure provides an electronic device that adjusts an oxygen saturation including an error and a method of controlling the same.

According to various embodiments, an electronic device may include a first sensor configured to detect a movement, a second sensor configured to measure an oxygen saturation, a memory, and at least one processor operatively connected to the first sensor, the second sensor, and the memory, and the at least one processor is configured to identify whether a period in which a posture is maintained before a movement is detected is greater than or equal to a predetermined period if a movement greater than or equal to a predetermined value is detected via the first sensor, to identify an oxygen saturation reference value stored in the memory if the period in which the posture is maintained before the movement is detected is greater than or equal to the predetermined period, and to adjust, based on the oxygen saturation reference value, an oxygen saturation value obtained via the second sensor during the period in which the posture is maintained before the movement is detected.

According to various embodiments, a method of controlling an electronic device may include, an operation of identifying whether a period in which a posture is maintained before the movement is detected is greater than or equal to a predetermined period if a movement greater than or equal to a predetermined value is detected via a first sensor for detecting a movement, an operation of obtaining an oxygen saturation reference value stored in a memory if the period in which the posture is maintained before the movement is detected is greater than or equal to the predetermined period, and an operation of adjusting, based on the oxygen saturation reference value, an oxygen saturation value obtained via a second sensor for measuring an oxygen saturation during the period in which the posture is maintained before the movement is detected.

According to various embodiments, an electronic device may include a communication module (including communication circuitry), a memory, and at least one processor operatively connected to the communication module and the memory, and the at least one processor is configured to identify whether a period in which a posture is maintained before a movement is detected is greater than or equal to a predetermined period if the movement of an external electronic device that is greater than or equal to a predetermined value is identified based on a sensing value received from the external electronic device via the communication module, to obtain an oxygen saturation reference value stored in the memory if the period in which the posture is maintained before the movement is detected is greater than or equal to the predetermined period, and to adjust, based on the oxygen saturation reference value, an oxygen saturation value received from the external electronic device during the period in which the posture is maintained before the movement is detected.

Before undertaking the detailed description below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

An electronic device according to various embodiments of the disclosure may adjust an error to fall within a normal range so as to obtain an accurate oxygen saturation value during sleep if an error occurs in measuring an oxygen saturation since an electronic device is pressed by the body of a user or a gap between the electronic device and the user's body is caused due to tossing and turning in bed.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 9A illustrates an operation of adjusting an oxygen saturation by an electronic device over time according to various embodiments;

FIG. 9B illustrates an operation of adjusting an oxygen saturation by an electronic device over time according to various embodiments;

FIG. 9C illustrates an operation of adjusting an oxygen saturation by an electronic device over time according to various embodiments;

FIG. 9D illustrates an operation of adjusting an oxygen saturation by an electronic device over time according to various embodiments;

FIG. 9E illustrates an operation of adjusting an oxygen saturation by an electronic device over time according to various embodiments;

DETAILED DESCRIPTION

FIGS. 1 through 10B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
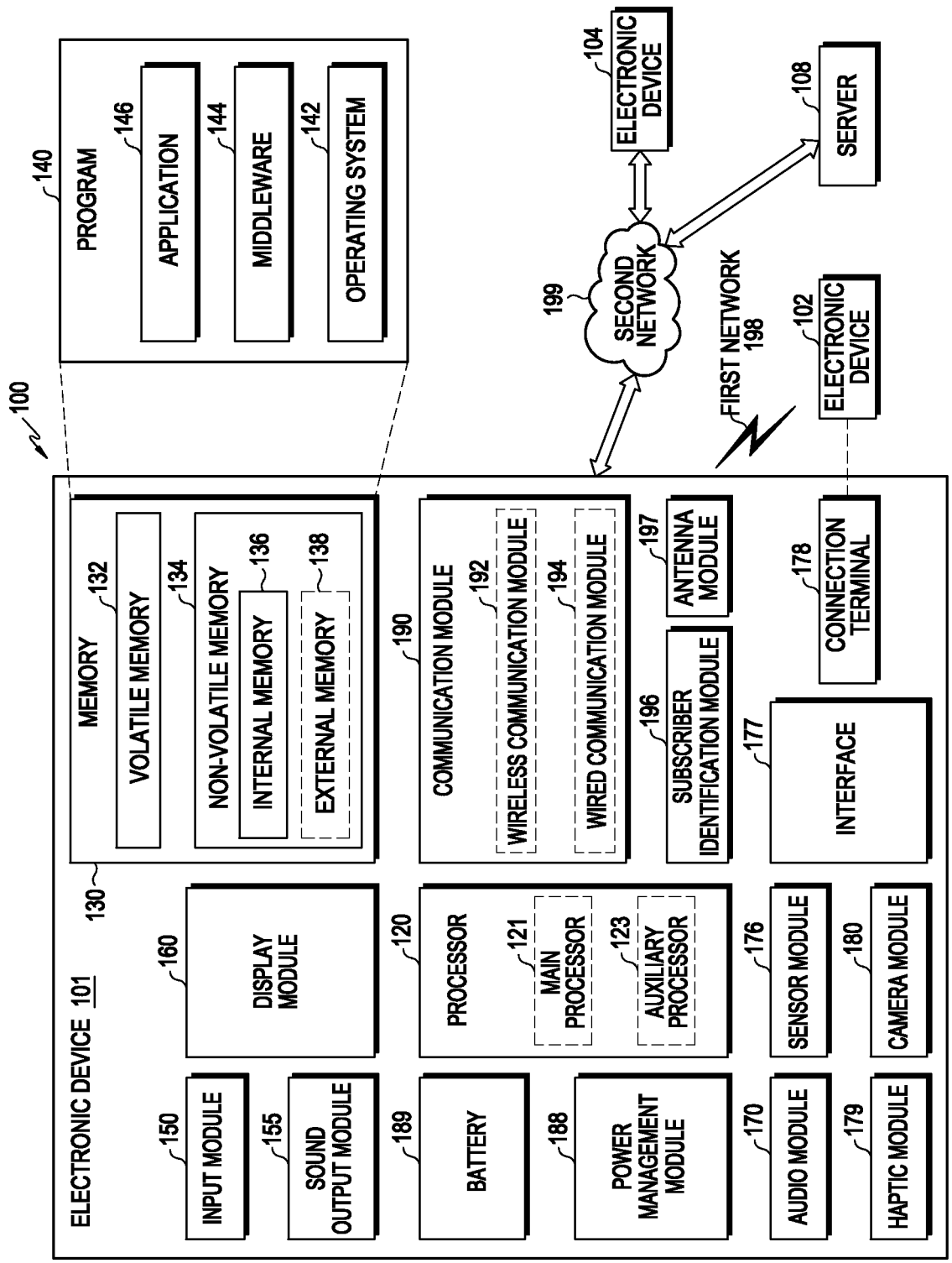
FIG. 1 illustrates a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
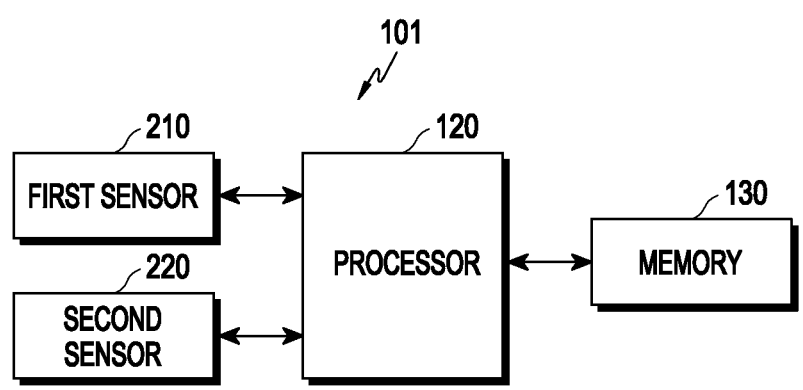
FIG. 2 illustrates the brief configuration of an electronic device according to various embodiments.

FIG. 2 illustrates the brief configuration of an electronic device according to various embodiments.

According to various embodiments, referring to FIG. 2, the electronic device 101 (e.g., the electronic device 101 of FIG. 1) may include a first sensor 210 (e.g., the sensor module 176 of FIG. 1), a second sensor 220 (e.g., the sensor module 176 of FIG. 1), the memory 130 (e.g., the memory 130 of FIG. 1), and the processor 120 (e.g., the processor 120 of FIG. 1).

According to various embodiments, the electronic device 101 may be a wearable device that is worn on the body part of a user (e.g., a smartwatch, a smart band, a smart ring, wireless earphones, or smart glasses). Hereinafter, the electronic device 101 is illustrated as a wearable device for ease of description, although the electronic device 101 according to various embodiments may be a terminal device (e.g., a smartphone) or a server that communicates with a wearable device that is worn by a user.

According to various embodiments, the first sensor 210 may detect a movement of the electronic device 101. According to various embodiments, the first sensor 210 may detect the movement of the electronic device 101 based on at least one of the speed of the electronic device 101, the acceleration, the angular speed, the angular acceleration, or a change in the direction of gravity. For example, the first sensor 210 may include at least one of an accelerometer, a gyro sensor, or a gravitational acceleration sensor. Not illustrated thereto, the first sensor 210 may include various types of sensors capable of detecting the posture (or movement) of a user who wears the electronic device 101. According to an embodiment, the processor 120 may identify the posture of a user by identifying acceleration information of an acceleration sensor (e.g., the size of 3 axes (e.g., x, y, and z axes)) and/or atmospheric pressure data with variation of displacement of the electronic device 101 obtained by an atmospheric pressure sensor (e.g., an atmospheric pressure gradient and atmospheric pressure peak2peak (p2p) value). According to various embodiments, the processor 120 may identify the posture of a user based on a combination of data obtained from the first sensor 210 and/or the second sensor 220.

According to various embodiments, the second sensor 220 may be in contact with the body part of a user, and may measure an oxygen saturation. For example, the second sensor 220 (e.g., the sensor module 176 of FIG. 1) may include at least one of a PPG sensor or a pulse oximetry sensor.

According to various embodiments, the second sensor 220 may include a light source that emits light of two wavelengths (e.g., RED and Infrared), and a light receiver (e.g., an optical diode) that senses light which is partially reflected from the skin or blood vessel of a user after being emitted from the light source. For example, the second sensor 220 may emit an optical signal to a body part of a user (e.g., a finger or a blood vessel in a wrist, a radial artery under a wrist) using a plurality of light sources capable of emitting light having the same or different wavelengths respectively, may accumulate photocharges corresponding to the amount of light incident to the plurality of light receivers via reflection or penetration, and may convert an analog current type biometric signal associated with the accumulated optical charge into a digital signal. The second sensor 220 may perform an operation so that at least two types of biometric information are obtained among a plurality of pieces of biometric information, for example, a heart rate, a blood oxygen saturation, a BIA signal, an ECG signal, and a blood pressure. For example, the second sensor 220 may perform an operation so that a heart rate, a blood oxygen saturation, and a BIA signal are obtained simultaneously. According to an embodiment, the second sensor 220 may include a laser diode (LD) and an image sensor. According to an embodiment, the second sensor 220 may include a plurality of sensors for obtaining a plurality of pieces of biometric information, respectively. For example, the second sensor 220 may include independent (or separate) sensors for respectively obtaining a plurality of types of biometric information, such as a sensor for obtaining pulses, a sensor for obtaining an oxygen saturation, and a sensor for obtaining a blood pressure.

According to various embodiments, the memory 130 may store a sensing value related to a movement of the electronic device 101 obtained via the first sensor 210, and an oxygen saturation value obtained via the second sensor 220.

According to various embodiments, the memory 130 may include a buffer. For example, the electronic device 101 may temporarily store an oxygen saturation value obtained from the second sensor 220 in the buffer.

According to various embodiments, the processor 120 may operatively connect to the first sensor 210, the second sensor 220, and the memory 130. For example, the processor 120 may perform at least one operation among obtaining data, processing data, or storing data using the first sensor 210, the second sensor 220, and the memory 130.

According to various embodiments, if a movement greater than or equal to a predetermined value is detected by the first sensor 210, the processor 120 may adjust an oxygen saturation value stored in the buffer, and may store the adjusted oxygen saturation value in the memory 130. According to an embodiment, if the size of the buffer is limited, the processor 120 may complete adjustment and may initialize the buffer. According to an embodiment, the processor 120 may periodically delete data stored in the memory 130. For example, the processor 120 may delete oxygen saturation data which has been stored at least a predetermined period of time (e.g., three months) in the memory. For example, if the number of pieces of oxygen saturation data stored in advance is greater than or equal to a predetermined number, the processor 120 may sequentially delete data from the data stored first. As an example only, the electronic device 101 includes the first sensor 210 and the second sensor 220, but the electronic device 101 according to various embodiments may be a terminal device or a server that communicates with an external electronic device that is a wearable device.

According to various embodiments, if the electronic device 101 is a terminal device or a server that communicates with a wearable device, the electronic device 101 may receive a sensing value or an oxygen saturation value related to a movement of an external electronic device from the external electronic device via a communication module (e.g., the communication module 190 of FIG. 1), and may adjust the received oxygen saturation value. For example, if a movement of the external electronic device greater than or equal to a predetermined value is identified based on a sensing value received from the external electronic device, the electronic device 101 may identify whether the period in which a posture is maintained before the movement is detected is greater than or equal to a predetermined period. According to various embodiments, if the period in which the posture is maintained before the movement is detected is greater than or equal to the predetermined period, the electronic device 101 may obtain an oxygen saturate reference value stored in the memory, and may adjust, based on the oxygen saturate reference value, the oxygen saturate value received from the external electronic device during the period in which the posture is maintained before the movement is detected.

According to various embodiments, even when the electronic device 101 is a terminal device or a server that communicates with a wearable device, the electronic device 101 may adjust an oxygen saturation value via operations in FIGS. 3 to 11, except for an operation of sensing a movement of the electronic device 101 or an operation of measuring an oxygen saturation value via a sensor.

Figure 3:
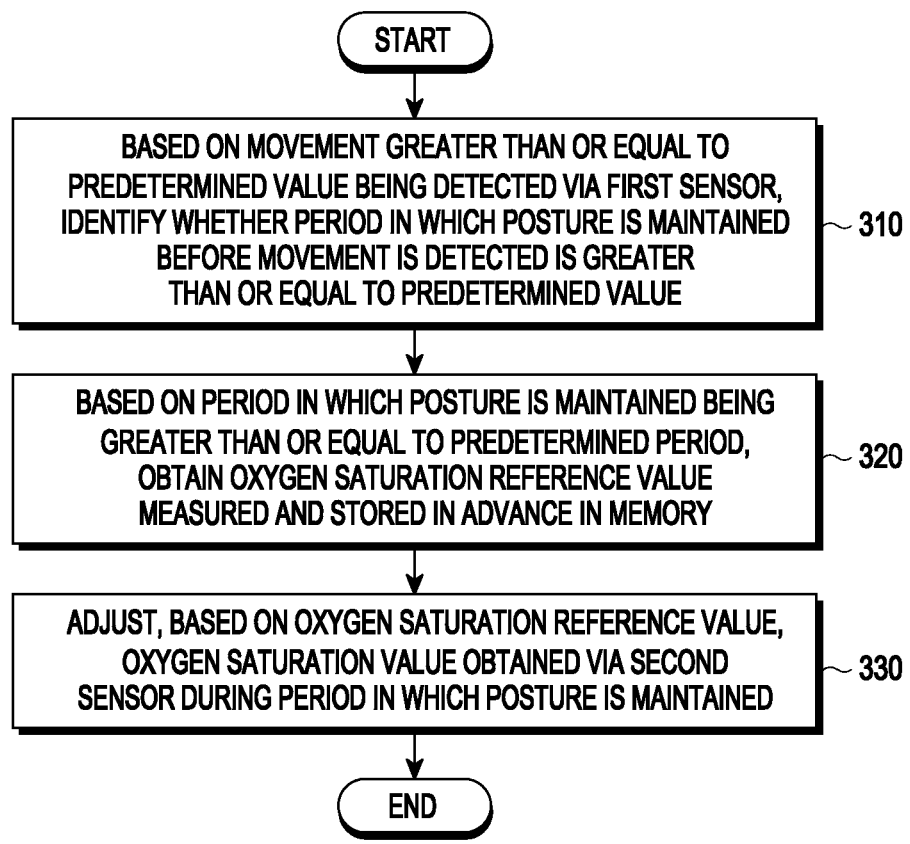
FIG. 3 illustrates a method of adjusting an oxygen saturation by an electronic device according to various embodiments.

FIG. 3 illustrates a method of adjusting an oxygen saturation by an electronic device according to various embodiments.

According to various embodiments, referring to FIG. 3, in operation 310, an electronic device (e.g., the electronic device 101 of FIG. 1, the processor 120 of FIG. 1, the electronic device 101 of FIG. 2, or the processor 120 of FIG. 2) may identify whether a period in which a posture is maintained before a movement is detected is greater than or equal to a predetermined value based on movement greater than or equal to predetermined value being detected via a first sensor (e.g., the sensor module 176 of FIG. 1, or the first sensor 210 of FIG. 2).

According to various embodiments, the electronic device may obtain a sensing value based on an orthogonal coordinate system or a spherical coordinate system via a first sensor. According to various embodiments, if a sensing value based on the orthogonal coordinate system is obtained via the first sensor, the electronic device may convert the sensing value based on the orthogonal coordinate system into a sensing value based on the spherical coordinate system.

According to various embodiments, if a change in the sensing value based on the spherical coordinate system is greater than or equal to a predetermined value, the electronic device may detect the change as a movement greater than or equal to the predetermined value. The movement detection by the electronic device according to various embodiments will be described with reference to FIG. 7.

According to various embodiments, if a movement greater than or equal to the predetermined value is detected, the electronic device may increase a posture index stored in a memory. For example, in the state in which a posture index before a movement occurs is stored in the memory, if a movement greater than or equal to the predetermined value is detected, the electronic device may identify that the posture of a user is changed, may add 1 to the stored posture index, and may store the posture index obtained by adding 1 thereto in the memory. According to various embodiments, a posture index may be a tag for distinguishing a plurality of postures taken while a user sleeps.

According to various embodiments, the electronic device may increase a posture index, and may maintain the increased posture index during a predetermined period even though a movement greater than or equal to the predetermined value is detected. For example, if the electronic device continuously moves since a user tosses and turns in bed during sleep, even when a movement greater than or equal to the predetermined value is detected at least once during a predetermined time (e.g., 3 seconds) set after a movement greater than or equal to the predetermined value is detected, the electronic device may maintain the posture index and may prevent unnecessary increase of the posture index.

An operation increasing a posture index and an operation of maintaining a posture index during a predetermined period according to various embodiments will be described with reference to FIGS. 5, 7, and 8.

According to various embodiments, in operation 320, based on the period in which the posture is maintained being greater than or equal to the predetermined period, the electronic device may obtain an oxygen saturation reference value measured and stored in advance in a memory (e.g., the memory 130 of FIG. 1 or the memory 130 of FIG. 2).

According to various embodiments, the predetermined period for the period in which the posture is maintained may be a predetermined set value before an oxygen saturation is measured, and may be set by a manufacturer or a user.

According to various embodiments, the predetermined period for the period in which the posture is maintained may be the minimum period among a plurality of different lengths of periods, wherein the difference between the maximum value of an oxygen saturation value measured in each period and the oxygen saturation reference value falls within a predetermined range.

According to various embodiments, the operation of obtaining the predetermined period for the period in which a posture is maintained will be described with reference to FIGS. 10A and 10B.

According to various embodiments, an oxygen saturation reference value stored in a memory may be the maximum value of an oxygen saturation value measured in advance in a stable state before an operation of measuring an oxygen saturation value during sleep. For example, the stable state may be the situation in which a user does not sleep and stably breathes, and a second sensor normally operates. According to various embodiments, the oxygen saturation reference value may be the average value of oxygen saturation values measured in advance in a stable state. According to various embodiments, the electronic device may receive oxygen saturation data stored in advance in a stable state from an external electronic device operatively connected to the electronic device. As another example, the electronic device may receive oxygen saturation data stored in advance via a server accessed by the same account.

According to various embodiments, in operation 330, the electronic device may adjust, based on the oxygen saturation reference value, an oxygen saturation value obtained via the second sensor (e.g., the first sensor module 176 of FIG. 1 or the second sensor 220 of FIG. 2) during the period in which the posture is maintained.

According to various embodiments, the memory may include a buffer, and the electronic device may store, in the buffer, an oxygen saturation value obtained during the period in which the posture is maintained before the movement is detected. According to various embodiments, the buffer may temporarily store data.

According to various embodiments, if a movement greater than or equal to the predetermined value is detected, the electronic device may adjust, based on the oxygen saturation reference value, the oxygen saturation value that is obtained during the period in which the posture is maintained before the movement is detected and is stored in the buffer. According to various embodiments, the electronic device may store the adjusted oxygen saturation value in the memory.

According to various embodiments, the electronic device may store, in the buffer, an oxygen saturation value obtained via the second sensor after a movement greater than or equal to the predetermined value is detected. According to various embodiments, if a new movement greater than or equal to the predetermined value is detected, the electronic device may adjust the oxygen saturation value obtained and stored in the buffer before the new movement is detected.

According to various embodiments, the electronic device may obtain the maximum value of an oxygen saturation value obtained during the period in which the posture is maintained before the movement is detected. For example, the electronic device may obtain, as a base line, the maximum value of an oxygen saturation value obtained during the period in which the posture is maintained before the movement is detected. According to various embodiments, the electronic device may divide the period in which the posture is maintained before the movement is detected into a plurality of sections, and may obtain the maximum value of an oxygen saturation value in each section as a base line.

According to various embodiments, based on the difference between the maximum value and the oxygen saturation reference value, the electronic device may adjust an oxygen saturation value obtained during the period in which the posture is maintained before the movement is detected.

According to various embodiments, the electronic device may divide the period in which the posture is maintained before the movement is detected into a plurality of sections, may obtain the average value of oxygen saturation values of the sections as a base line, and may adjust, based on the difference between the obtained average value and the oxygen saturation reference value, the oxygen saturation value obtained during the period in which the posture is maintained. According to various embodiments, if the average value of oxygen saturation values is obtained as a base line, the oxygen saturation reference value may be the average value of oxygen saturation values measured in a stable state.

According to various embodiments, if the period in which the posture is maintained before the movement is detected is less than the predetermined period, an oxygen saturation value obtained during the period in which the posture is maintained before the movement is detected may be disregarded.

According to various embodiments, an operation of adjusting an oxygen saturation over time will be described with reference to FIG. 9.

Figure 4:
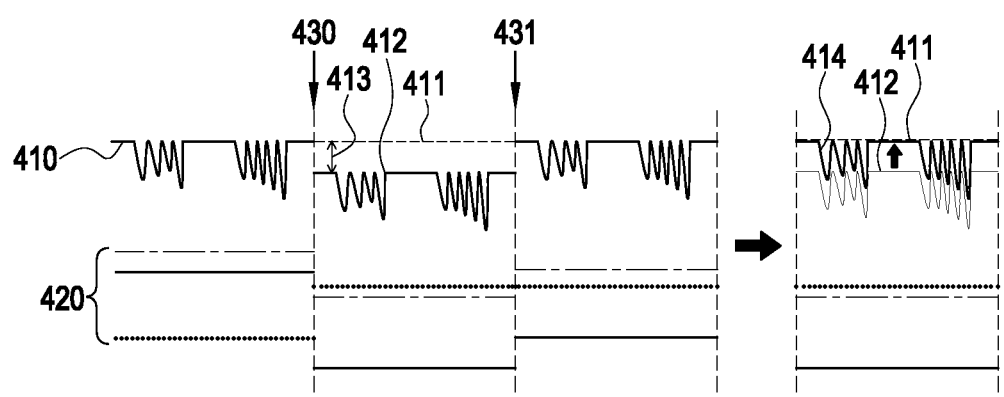
FIG. 4 illustrates an operation of adjusting an oxygen saturation by an electronic device according to various embodiments.

FIG. 4 illustrates an operation of adjusting an oxygen saturation by an electronic device according to various embodiments.

According to various embodiments, referring to FIG. 4, an electronic device (e.g., the electronic device 101 of FIG. 1, the processor 120 of FIG. 1, the electronic device 101 of FIG. 2, or the processor 120 of FIG. 2) may obtain a sensing value 420 related to a movement of the electronic device via a first sensor for measuring a movement of the electronic device (e.g., the sensor module 176 of FIG. 1 or the first sensor 210 of FIG. 2), and may obtain an oxygen saturation value 410 via a second sensor (e.g., the sensor module 176 of FIG. 1 or the second sensor 220 of FIG. 2) for measuring an oxygen saturation.

According to various embodiments, the electronic device may detect points 430 and 431 at which the sensing value 420 related to the movement of the electronic device is changed to be greater than or equal to a predetermined value.

According to various embodiments, the electronic device may identify that the posture of a user who wears the electronic device is changed at the points 430 and 431 at which the sensing value 420 related to the movement of the electronic device is changed to be greater than or equal to the predetermined value, and the electronic device may identify that the posture of the user is maintained in a section in which the sensing value 420 related to the movement of the electronic device is maintained.

According to various embodiments, an oxygen saturation value 412 obtained by the second sensor at a point between the first point 430 and the second point 431 at which the movement of the electronic device is detected may be identified as having an offset 413 when compared to an oxygen saturation reference value 411 in a stable state and is stored in a memory (e.g., the memory 130 of FIG. 1 or the memory 130 of FIG. 2).

According to various embodiments, if the second point 431 at which the sensing value 420 related to the movement of the electronic device is changed to be greater than or equal to the predetermined value is detected, the electronic device may adjust the oxygen saturation value 412 between the first point 430 and the second point 431 based on the oxygen saturation reference value 411, and may obtain an adjusted oxygen saturation value 414.

If an error occurs in measuring an oxygen saturation since the electronic device is pressed by the body of a user or a gap between the body and the electronic device is caused by tossing or turning in bed during sleep, the electronic device may adjust an error to fall within a normal range so as to obtain an accurate oxygen saturation value during sleep.

Figure 5:
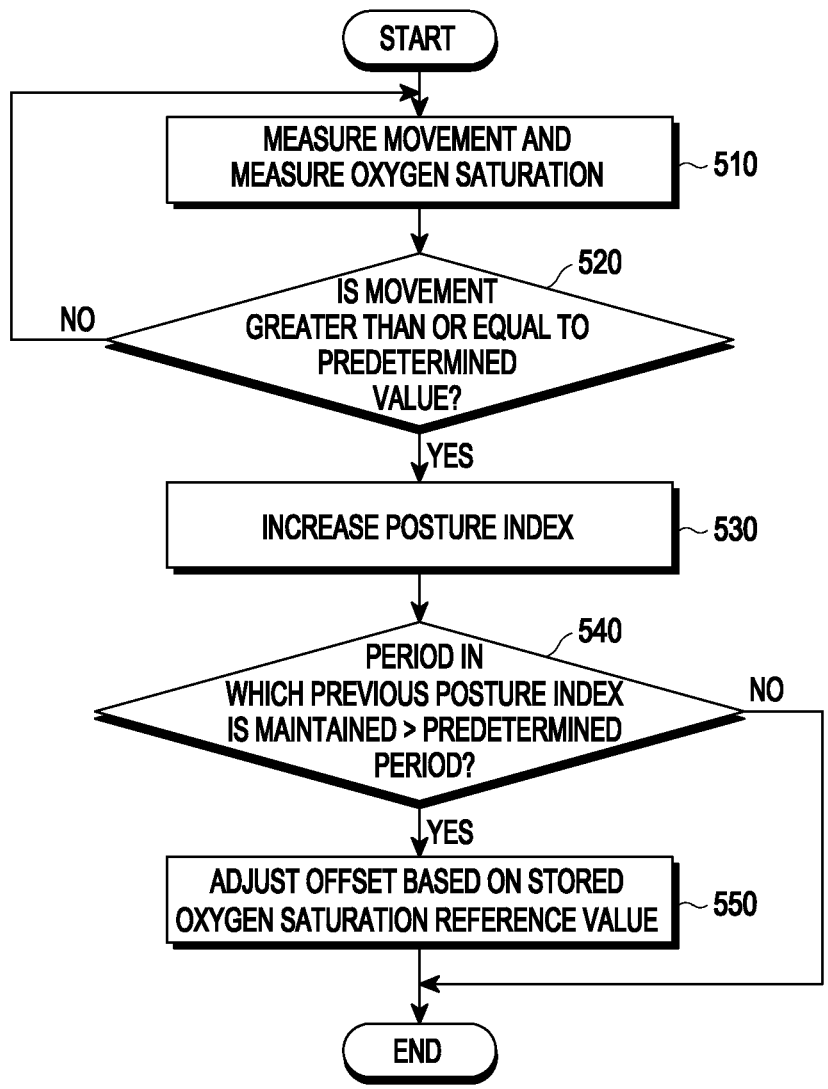
FIG. 5 illustrates a method of adjusting an oxygen saturation by an electronic device based on a period in which a posture is maintained according to various embodiments.

FIG. 5 illustrates a method of adjusting an oxygen saturation by an electronic device based on the period in which a posture is maintained according to various embodiments.

According to various embodiments, referring to FIG. 5, an electronic device (e.g., the electronic device 101 of FIG. 1, the processor 120 of FIG. 1, the electronic device 101 of FIG. 2, or the processor 120 of FIG. 2) may measure a movement and an oxygen saturation in operation 510.

According to various embodiments, the electronic device may measure a movement of the electronic device using a first sensor (e.g., the sensor module 176 of FIG. 1 or the first sensor 210 of FIG. 2), and may measure an oxygen saturation value via a second sensor (e.g., the sensor module 176 of FIG. 1 or the second sensor 220 of FIG. 2).

According to various embodiments, the electronic device may store a movement measurement value and an oxygen saturation value in a memory (e.g., the memory 130 of FIG. 1 or the memory 130 of FIG. 2, a buffer).

According to various embodiments, in operation 520, the electronic device may identify whether the electronic device moves at least a predetermined value.

According to various embodiments, if a sensing value obtained via the first sensor is greater than or equal to the predetermined value, the electronic device may identify a change of the posture of the user. For example, in response to identifying, based on a sensing value, that the direction of the electronic device is changed, the electronic device may identify that the posture of the user has changed.

The direction of the electronic device according to the posture of a user during sleep according to various embodiments will be described with reference to FIG. 6.

According to various embodiments, if a movement greater than or equal to the predetermined value is not identified (No in operation 520), the electronic device may return to operation 510, and may continuously measure a movement and an oxygen saturation.

According to various embodiments, in response to identifying that a movement greater than or equal to the predetermined value (Yes in operation 520), the electronic device may increase a posture index in operation 530.

According to various embodiments, the electronic device may increase a posture index, and may maintain the increased posture index during a predetermined period even though a movement greater than or equal to the predetermined value is detected. For example, if the electronic device continuously moves since a user tosses and turns in bed during sleep, even when a movement greater than or equal to the predetermined value is detected at least once during a predetermined time (e.g., 3 seconds) set after a movement greater than or equal to the predetermined value is detected, the electronic device may maintain the posture index and may prevent an unnecessary increase of the posture index.

According to various embodiments, in operation 540, the electronic device may identify whether the period in which a previous posture index is maintained is greater than or equal to a predetermined period. For example, if the posture index is increased according to a movement, the period in which the previous index is maintained before the posture index is increased is greater than or equal to a predetermined period.

According to various embodiments, the predetermined period for the period in which a posture is maintained may be a predetermined value before an oxygen saturation is measured, and may be set by a manufacturer or a user. According to various embodiments, the operation of obtaining the predetermined period for the period in which a posture is maintained will be described with reference to FIGS. 10A and 10B.

According to various embodiments, if the period in which the previous posture index is maintained is greater than the predetermined period (Yes in operation 540), the electronic device may adjust an offset based on an oxygen saturation reference value stored in operation 550. According to various embodiments, the electronic device may perform an oxygen saturation adjustment operation when (for example, only when) the period in which a posture is maintained before a movement is detected is greater than or equal to the predetermined period.

For example, if the period in which the previous posture index is maintained is greater than or equal to the predetermined period, the electronic device may obtain a base line based on an oxygen saturation value that is stored in the buffer and is obtained during the period in which the previous posture index is maintained. According to various embodiments, the electronic device may divide the period in which the previous posture index is maintained into a plurality of sections, and may obtain the maximum value of an oxygen saturation value in each section or the average value thereof as a base line.

According to various embodiments, the electronic device may obtain an offset between the oxygen saturation reference value and the base line based on the oxygen saturation reference value stored in the memory. For example, the oxygen saturation reference value may be the maximum value or an oxygen saturation in a stable state or the average value thereof. For example, the offset may be the difference between the base line and the oxygen saturation reference value. According to various embodiments, the offset may be a rate of a base line to the oxygen saturation reference value (e.g., a value obtained by dividing the base line by the oxygen saturation reference value).

According to various embodiments, the electronic device may apply the obtained offset to an oxygen saturation value obtained during the period in which the previous posture index is maintained, so as to adjust an oxygen saturation value obtained during the period in which the previous posture index is maintained. For example, the electronic device may adjust the oxygen saturation value by adding the offset to, or subtracting the offset from, the oxygen saturation value obtained during the period in which the previous posture index is maintained. According to various embodiments, the electronic device may adjust then oxygen saturation value by multiplying the oxygen saturation value by the offset.

According to various embodiments, if the period in which the previous posture index is maintained is less than the predetermined period (No in operation 540), the electronic device may terminate the oxygen saturation adjustment operation. According to various embodiments, the electronic device may disregard the oxygen saturation value measured during the period in which the previous posture index is maintained.

Figure 6:
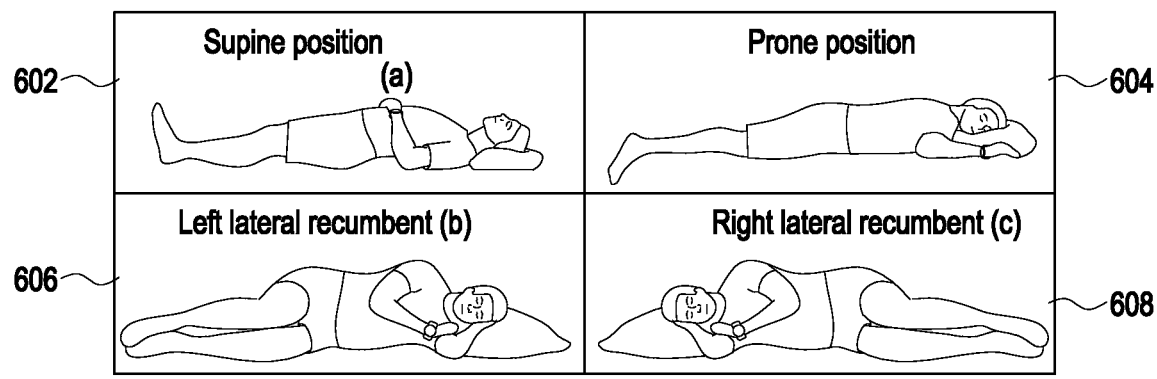
FIG. 6 illustrates the direction of an electronic device based on a sleep posture according to various embodiments.
Figure 6:
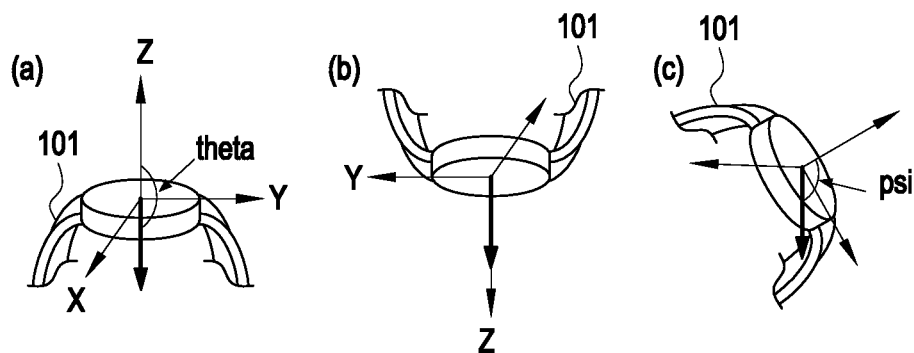

FIG. 6 illustrates the direction of an electronic device based on a sleep posture according to various embodiments.

According to various embodiments, referring to FIG. 6, the direction of an electronic device (e.g., the electronic device 101 of FIG. 1 or the electronic device 101 of FIG. 2) may be associated with a sleep posture.

For example, if a sleep posture is a supine position 602 (*a*), the electronic device may be in the direction in which the direction of gravity may be identical to the −Z axis in the three-dimensional coordinate system in the electronic device, a theta that is the angle with the Z-axis may be 180 degrees, and a psi that is the angle with the X-axis may be 0 degrees.

According to various embodiments, if the sleep posture is a prone position 604, the direction of the electronic device is similar to the supine position (a), but the electronic device may distinguish the supine position 602 and the prone position 604 by continuously sensing the direction of the electronic device and detecting a change of the direction.

According to various embodiments, if the sleep posture is a left lateral recumbent position 606 (*b*), the electronic device is in the direction in which the direction of gravity may be identical to the Z-axis in the three-dimensional coordinate system in the electronic device, a theta may be 0 degrees, and a psi may be 0 degrees.

According to various embodiments, if the sleep posture is a right lateral recumbent position 608 (*c*), the electronic device is in the direction in which the direction of gravity may not be identical to any axis in the three-dimensional coordinate system in the electronic device, a theta may be 120 degrees, and a psi may be 30 degrees.

A sleep posture and the direction of an electronic device according to various embodiments are not limited to the above-description. Since the direction of the electronic device is changed when a sleep posture is changed, the electronic device may identify that the sleep posture is changed when detecting a change in the direction of the electronic device. According to various embodiments, based on a sleep posture before a movement, the direction of the electronic device, and the direction of the electronic device after the movement, the electronic device may identify a sleep posture after the movement.

Figure 7:
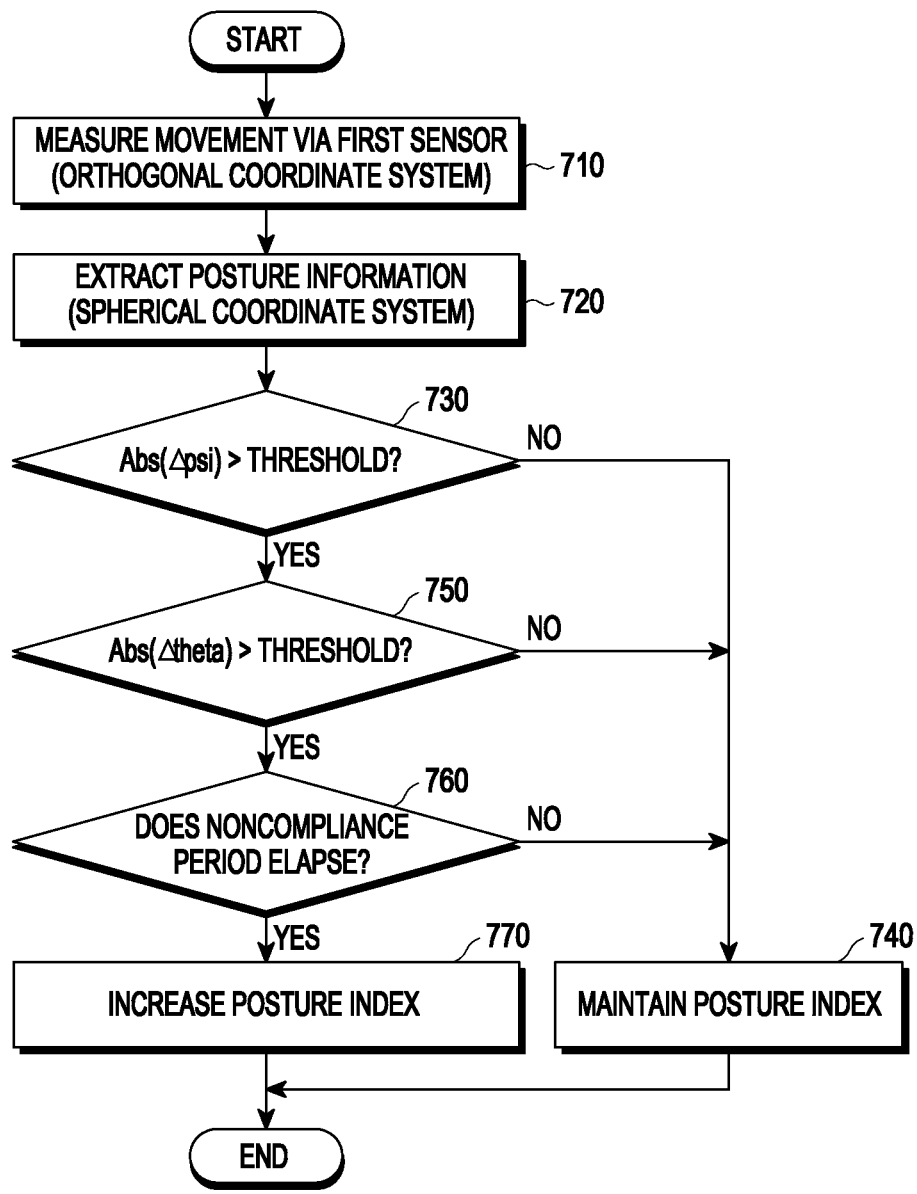
FIG. 7 illustrates a method of changing a posture index by an electronic device according to various embodiments.

FIG. 7 illustrates a method of changing a posture index by an electronic device according to various embodiments.

According to various embodiments, referring to FIG. 7, an electronic device (e.g., the electronic device 101 of FIG. 1, the processor 120 of FIG. 1, the electronic device 101 of FIG. 2, or the processor 120 of FIG. 2) may measure a movement of the electronic device via a first sensor (e.g., the sensor module 176 of FIG. 1 or the first sensor 210 of FIG. 2) in operation 710. For example, the electronic device may measure a movement based on an orthogonal coordinate system via the first sensor (e.g., an acceleration sensor). For example, the electronic device may measure a movement in the X-axis direction, a movement in the Y-axis direction, and a movement in the Z-axis direction.

According to various embodiments, the electronic device may extract posture information in operation 720. For example, the electronic device may change a sensing value based on an orthogonal coordinate system into a sensing value based on a spherical coordinate system. According to various embodiments, based on a movement in the X-axis direction, a movement in the Y-axis direction, and a movement in the Z-axis direction, the electronic device may obtain a theta that is the angle with the Z-axis and a psi that is the angle with the X-axis in the three-dimensional coordinate system in the electronic device. According to various embodiments, the electronic device may identify the direction of the electronic device based on the sensing value based on the spherical coordinate system.

According to various embodiments, the electronic device may identify the sleep posture of a user based on the direction of the electronic device. For example, based on a sleep posture before a movement, the direction of the electronic device, and the direction of the electronic device after the movement, the electronic device may identify a sleep posture after the movement.

According to various embodiments, if a sensing value based on the spherical coordinate system is obtained via the first sensor, the electronic device may omit conversion of a sensing value based on the orthogonal coordinate system into a sensing value based on the spherical coordinate system.

According to various embodiments, in operation 730, the electronic device may identify whether the variation (e.g., absolute value of a variation of psi illustrated as Abs(Δpsi)) of a psi is greater than or equal to a threshold value. For example, the threshold value may be a predetermined value for the variation of a psi.

According to various embodiments, in response to identifying that the variation of a psi is less than the predetermined value (No in operation 730), the electronic device may maintain a posture index in operation 740. For example, if the variation of a psi is less than the predetermined value, the electronic device may identify that the posture is not changed and may maintain the posture index.

According to various embodiments, if the variation of a psi is greater than or equal to the predetermined value (Yes in operation 730), the electronic device may identify whether the variation (e.g., absolute value of a variation of theta illustrated as Abs(Δtheta)) of a theta is greater than or equal to a threshold value in operation 750. For example, the threshold value may be a predetermined value for the variation of a theta.

According to various embodiments, if the variation of theta is less than the predetermined value (No in operation 750), the electronic device may maintain the posture index in operation 740. For example, if the variation of a theta is less than the predetermined value, the electronic device may identify that the posture is not changed and may maintain the posture index.

According to various embodiments, if the variation of a theta is greater than or equal to the predetermined value (Yes in operation 750), the electronic device may identify whether a noncompliance period elapses in operation 760. For example, the noncompliance period may be a period (e.g., 3 seconds) set to prevent a posture index from unnecessarily being increased when the electronic device continuously moves when a user tosses and turns during sleep.

According to various embodiments, operation 730 for identifying the variation of a psi may be performed after operation 750 for identifying the variation of a theta. According to various embodiments, in addition to the variation of a psi and the variation of a theta, the electronic device may identify a change in a posture based on the vector value, pitch, roll, yaw value of each axis.

According to various embodiments, if the noncompliance period does not elapse (No in operation 760), the electronic device may maintain the posture index in operation 740. For example, during a noncompliance period after the posture index is increased, the electronic device may maintain the posture index without increasing the posture index even though the variation of a theta and the variation of a psi greater than or equal to the predetermined value is detected.

According to various embodiments, if the noncompliance period elapses (Yes in operation 760), the electronic device may increase the posture index in operation 770. For example, the electronic device may add 1 to the stored posture index value so as to update the posture index.

Figure 8:
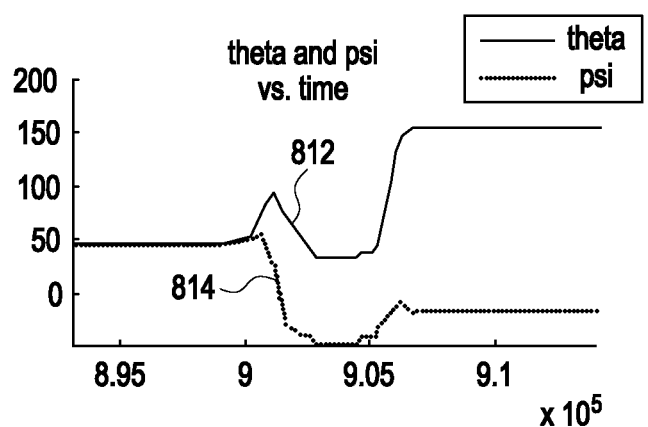
FIG. 8 illustrates an operation of changing a posture index by an electronic device according to various embodiments.
Figure 8:
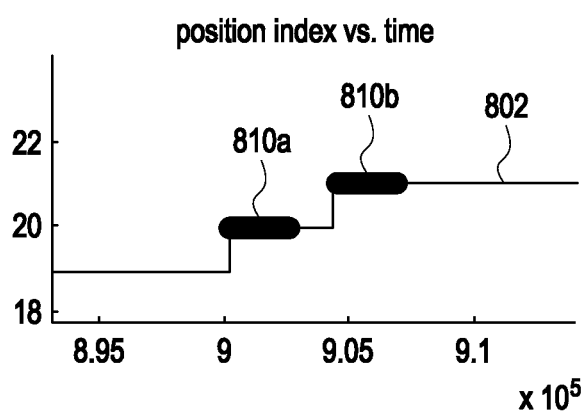

FIG. 8 illustrate an operation of changing a posture index 802 by an electronic device according to various embodiments. For example, FIG. 8 illustrates the operation of the electronic device in a noncompliance period.

According to various embodiments, referring to FIG. 8, an electronic device (e.g., the electronic device 101 of FIG. 1, the processor 120 of FIG. 1, the electronic device 101 of FIG. 2, or the processor 120 of FIG. 2) may maintain a posture index during a period 810*a* set after increasing the posture index from 19 to 20, even when a measured theta value 812 and psi value 814 are continuously changed. The electronic device may increase the posture index 802 from 20 to 21 when the predetermined period elapses. According to various embodiments, even after increasing the posture index to 21, the electronic device may maintain the posture index 802 during the set period 810*b* although a theta value and a psi value are changed to be greater than the predetermined value.

Therefore, although a user continuously moves and the direction of the electronic device is continuously changed, a posture index may be prevented from being increased unnecessarily.

FIG. 9A is diagram illustrating an operation of adjusting an oxygen saturation by an electronic device over time according to various embodiments.

FIG. 9B illustrates an operation of adjusting an oxygen saturation by an electronic device over time according to various embodiments;

FIG. 9C illustrates an operation of adjusting an oxygen saturation by an electronic device over time according to various embodiments;

FIG. 9D illustrates an operation of adjusting an oxygen saturation by an electronic device over time according to various embodiments;

FIG. 9E illustrates an operation of adjusting an oxygen saturation by an electronic device over time according to various embodiments;

According to various embodiments, referring to FIG. 9A, an electronic device (e.g., the electronic device 101 of FIG. 1, the processor 120 of FIG. 1, the electronic device 101 of FIG. 2, or the processor 120 of FIG. 2) may measure an oxygen saturation (SpO2) value (e.g., 95%) in the state in which the posture index is 11. For example, the measured oxygen saturation value may be stored in a buffer.

According to various embodiments, at the point in time at which the posture index is changed from 10 to 11, the electronic device may adjust an oxygen saturation value measured during the period in which the posture index is 10, so as to obtain an adjusted oxygen saturation value 910. For example, if the oxygen saturation value measured during the period in which the posture index is 10 is constant and the adjusted oxygen saturation value 910 is 93% and thus, an oxygen saturation reference value may be 93%.

According to various embodiments, referring to FIG. 9B, the electronic device may change a posture index from 11 to 12 based on the movement of the electronic device detected at a point t1, and may determine whether to adjust an oxygen saturation value measured during the period in which the posture index is 11. For example, if the period in which a posture index is maintained before a movement is greater than or equal to a predetermined period (e.g., 5 sections), the electronic device may determine to adjust the oxygen saturation value.

According to various embodiments, the period in which the posture index is 11 is 2 sections, and is shorter than 5 sections corresponding to the predetermined period in which a posture is maintained, the electronic device may disregard 920 without adjusting the measured oxygen saturation value.

According to various embodiments, referring to FIG. 9C, the electronic device may store, in the buffer, an oxygen saturation value 930 measured up to a point t2 that is the present from the point t1 at which the posture index is changed to 12.

According to various embodiments, referring to FIG. 9D, the electronic device may maintain the posture index as 12 after the point t2, and may store, in the buffer, an oxygen saturation value 940 measured during the period in which the posture index is maintained as 12.

According to various embodiments, the electronic device may change the posture index from 12 to 13 based on the movement of the electronic device detected a point t3, and may determine whether to adjust the oxygen saturation value measured during the period in which the posture index is 12.

According to various embodiments, the period in which the posture index is 12 is longer than 5 sections corresponding to the predetermined period in which the posture is maintained and thus, the electronic device may adjust the oxygen saturation value 940 measured during the period in which the posture index is 12 based on the oxygen saturation reference value (e.g., 93%).

According to various embodiments, referring to FIG. 9E, the electronic device may identify that a value of 80% that is the maximum value of the oxygen saturation value measured during the period in which the posture index is 12 is in a stable state, and may adjust 80% to correspond to the oxygen saturation reference value of 93% so as to obtain an adjusted oxygen saturation value 950.

Figure 10A:
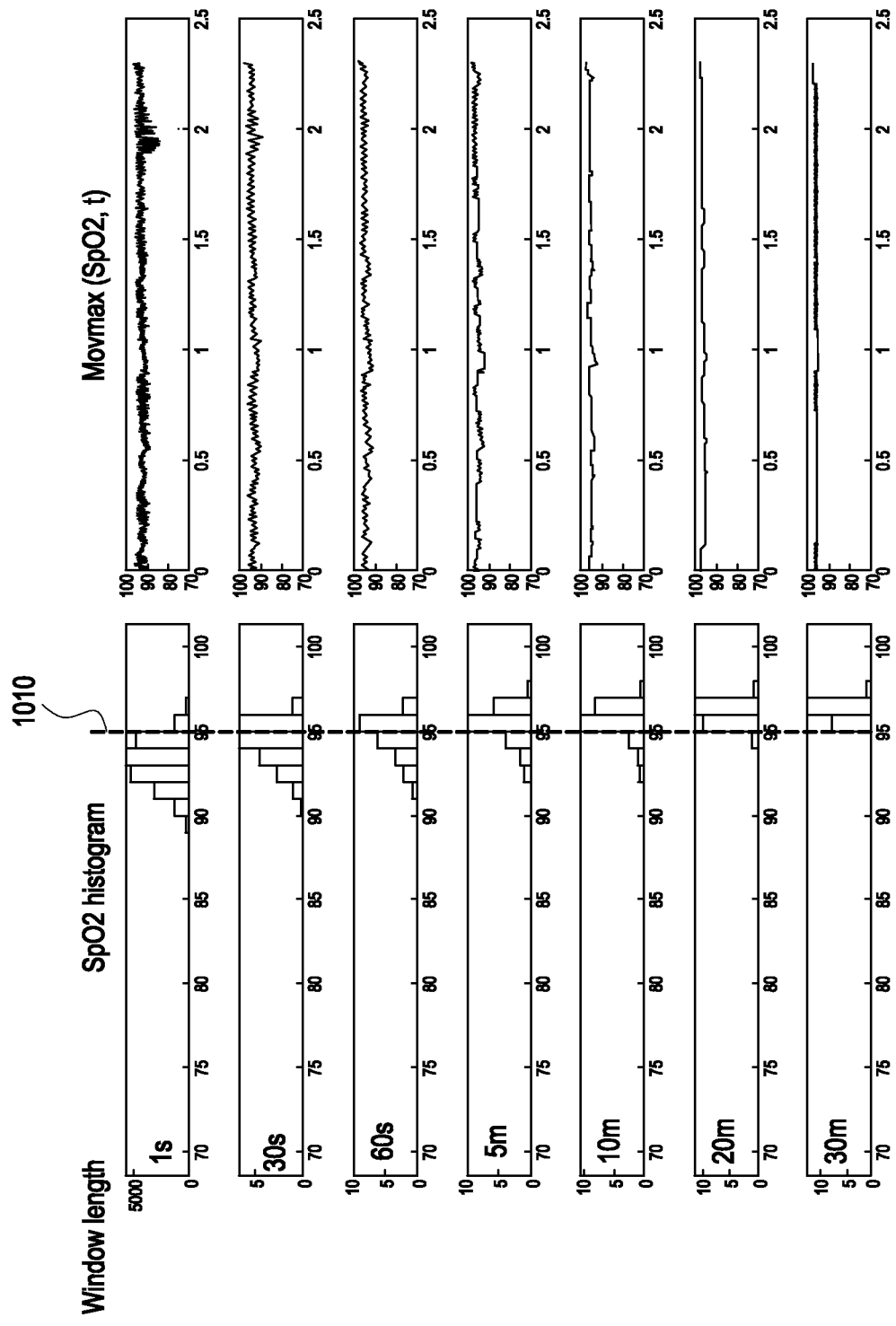
FIG. 10A illustrates an operation of setting a threshold value for a period in which a posture of an electronic device is maintained according to various embodiments.

FIG. 10A illustrates an operation of setting a threshold value for the period in which a posture of an electronic device is maintained according to various embodiments. For example, the threshold value for the period in which a posture is maintained may be set when the electronic device is manufactured or may be set by a user. According to various embodiments, FIG. 10A is a graph obtained by applying a moving window scheme to the oxygen saturation measurement value of a sleep apnea patient. According to various embodiments, the length of a window may be a candidate of a threshold value for the period in which a posture is maintained.

According to various embodiments, referring to FIG. 10A, there are provided a histogram showing the maximum value of an oxygen saturation (SpO2) in a window with variation of the length of a window, and a graph showing the difference (Movmax(SpO2,t)) between the maximum value of the oxygen saturation in a window and an oxygen saturation value in a stable state. According to various embodiments, the length of the window may be 1 seconds (s), 30 seconds, 60 seconds, 5 minutes (m), 10 minutes, 20 minutes, or 30 minutes.

According to various embodiments, the x-axis of the histogram shows an oxygen saturation, and the y-axis shows the number of windows of which the corresponding oxygen saturation is the maximum value, or the ratio of the number of windows of which the oxygen saturation is the maximum value to the total number of windows.

According to various embodiments, referring to the histogram, when the length of a window is long, the electronic device determines that the maximum value of an oxygen saturation value in the window is not intermittently decreased due to sleep apnea, and is distributed to be greater than or equal to an oxygen saturation 1010 in a stable state. Referring to the same histogram, when the length of a window is long, an oxygen saturation value decreased due to sleep apnea may be disregarded. In addition, if a threshold for the period in which a posture is maintained is long, there may be a lot of data to be disregarded without adjusting an oxygen saturation value measured even when the posture is constantly maintained.

According to various embodiments, in the case in which the length of a window is short, the difference (Movmax (SpO2,t)) between the maximum value of an oxygen saturation in the window and an oxygen saturation value in a stable state may be taken into consideration, since the difference between the maximum value of an oxygen saturation in a window and the oxygen saturation 1010 in a stable state may be different for each window and may be inconsistent. With reference to the same, if the length of a window is too short, an offset is different for each window and thus an inaccurate oxygen saturation value may be obtained via adjustment.

Figure 10B:
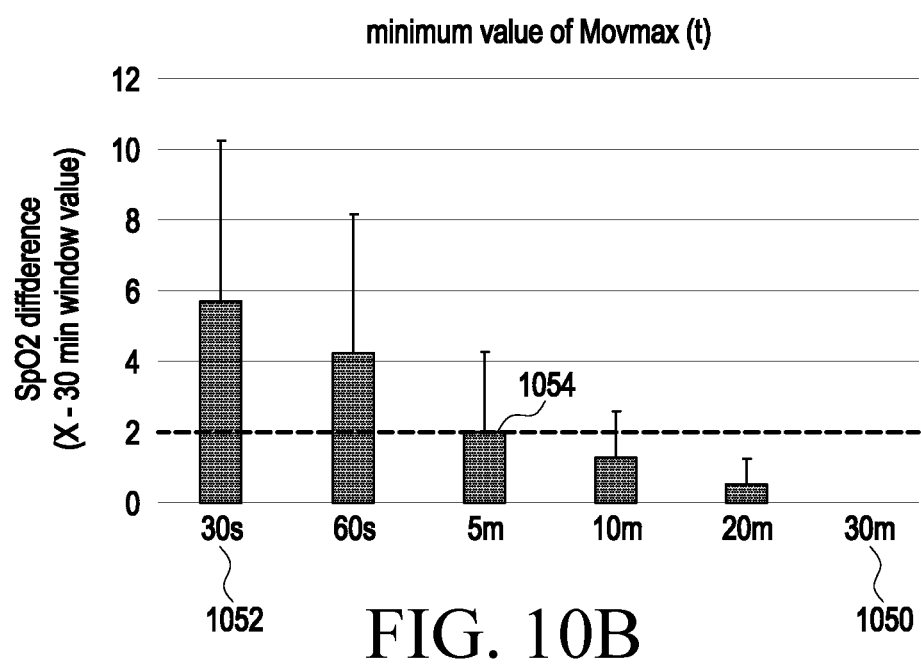
FIG. 10B illustrates an operation of setting a threshold value for a period in which a posture of an electronic device is maintained according to various embodiments.

According to various embodiments, as illustrated in FIG. 10B, the threshold value for the period in which a posture is maintained may be set to the minimum period among a plurality of the lengths of windows, wherein the difference between the maximum value of an oxygen saturation value measured and the oxygen saturation reference value falls within a predetermined range.

FIG. 10B illustrates an operation of setting a threshold value for the period in which a posture of an electronic device is maintained according to various embodiments. For example, FIG. 10B is a graph plotted with variation of the length of a window by obtaining data from 719 persons, wherein each piece of data is the minimum value of the difference between the maximum value of an oxygen saturation and an oxygen saturation value in a stable state in a window of FIG. 10A obtained from one person. According to various embodiments, if a window 1050 is 30 minutes, the electronic device determines that the maximum value of an oxygen saturation value is an oxygen saturation value in the stable state.

According to various embodiments, referring to FIG. 10B, in the case in which the length of a window 1052 is as short as 30 seconds, if the maximum value of the window is regarded as a base line, the electronic device determines that the difference from the oxygen saturation value in the stable state is averagely 6%. The difference may be decreased when the length of the window is increased. In certain embodiments, a measurement error of an oxygen saturation is 2%, and the electronic device identifies that the length of a window of 5 to 10 minutes may be appropriate for the threshold value for the period in which a posture is maintained. According to various embodiments, if a posture is maintained more than 5 to 10 minutes after a sleep posture is changed, the maximum value of the corresponding section may be regarded as a base line 1054 corresponding to a stable state.

According to various embodiments, an electronic device (the electronic device 101 of FIG. 1 or the electronic device 101 of FIG. 2) may include a first sensor (the sensor module 176 of FIG. 1 or the first sensor 210 of FIG. 2) configured to detect a movement, a second sensor (e.g., the sensor module 176 of FIG. 1 or the second sensor 220 of FIG. 2) configured to measure an oxygen saturation, a memory (e.g., the memory 130 of FIG. 1 or the memory 130 of FIG. 2), and at least one processor (e.g., the processor 120 of FIG. 1 or the processor 120 of FIG. 2) operatively connected to the first sensor, the second sensor, and the memory, wherein the at least one processor is configured to identify whether the period in which a posture is maintained before a movement is detected is greater than or equal to a predetermined period if a movement greater than or equal to a predetermined value is detected via the first sensor, to identify an oxygen saturation reference value stored in the memory if the period in which the posture is maintained before the movement is detected is greater than or equal to the predetermined period, and to adjust, based on the oxygen saturation reference value, an oxygen saturation value obtained via the second sensor during the period in which the posture is maintained before the movement is detected.

According to various embodiments, the at least one processor may be configured to obtain a sensing value based on an orthogonal coordinate system via the first sensor, to obtain a sensing value based on a spherical coordinate system based on the sensing value based on the orthogonal coordinate system, and if a change in the sensing value based on the spherical coordinate system is greater than or equal to the predetermined value, to detect the change as the movement greater than or equal to the predetermined value.

According to various embodiments, the at least one processor may increase a posture index stored in the memory if the movement greater than or equal to the predetermined value is detected, and may maintain the increased posture index even though the movement greater than or equal to the predetermined value is detected during a predetermined period after the posture index is increased.

According to various embodiments, the predetermined period may be the minimum period among a plurality of different lengths of periods, wherein the difference between the maximum value of an oxygen saturation value measured in each period and the oxygen saturation reference value falls within a predetermined range.

According to various embodiments, the memory may include a buffer, and the at least one processor may be configured to store, in the buffer, the oxygen saturation value obtained during the period in which the posture is maintained before the movement is detected, and if the movement greater than or equal to the predetermined value is detected, to adjust, based on the oxygen saturation reference value, the oxygen saturation value that is obtained during the period in which the posture is maintained before the movement is detected, and is stored in the buffer.

According to various embodiments, the at least one processor may be configured to store, in the buffer, the oxygen saturation value obtained via the second sensor after the movement greater than or equal to the predetermined value is detected.

According to various embodiments, the at least one processor may be configured to obtain the maximum value of the oxygen saturation value obtained during the period in which the posture is maintained before the movement is detected, and to adjust, based on the difference between the maximum value and the oxygen saturation reference value, the oxygen saturation value obtained during the period in which the posture is maintained before the movement is detected.

According to various embodiments, the oxygen saturation reference value may be the maximum value of an oxygen saturation value measured in advance in a stable state.

According to various embodiments, if the period in which the posture is maintained before the movement is detected is less than the predetermined period, the at least one processor disregards the oxygen saturation value obtained during the period in which the posture is maintained before the movement is detected.

According to various embodiments, a method of controlling an electronic device may include identifying whether the period in which a posture is maintained before the movement is detected is greater than or equal to a predetermined period if a movement greater than or equal to a predetermined value is detected via a first sensor for detecting a movement, obtaining an oxygen saturation reference value stored in a memory if the period in which the posture is maintained before the movement is detected is greater than or equal to the predetermined period, and adjusting, based on the oxygen saturation reference value, an oxygen saturation value obtained via a second sensor for measuring an oxygen saturation during the period in which the posture is maintained before the movement is detected.

According to various embodiments, the operation of identifying whether the period in which the posture is maintained before the movement is detected is greater than or equal to the predetermined period, may include an operation of obtaining a sensing value based on an orthogonal coordinate system via the first sensor, an operation of obtaining a sensing value based on a spherical coordinate system based on the sensing value based on the orthogonal coordinate system, and an operation of detecting the change as the movement greater than or equal to the predetermined value if a change in the sensing value based on the spherical coordinate system is greater than or equal to the predetermined value.

According to various embodiments, the at least one processor may further include an operation of increasing a posture index stored in the memory if the movement greater than or equal to the predetermined value is detected, and an operation of maintaining the increased posture index even when the movement greater than or equal to the predetermined value is detected during a predetermined period after the posture index is increased.

According to various embodiments, the predetermined period may be the minimum period among a plurality of different lengths of periods, wherein the difference between the maximum value of an oxygen saturation value measured in each period and the oxygen saturation reference value falls within a predetermined range.

According to various embodiments, the method may further include an operation of storing, in a buffer included in the memory, the oxygen saturation value obtained during the period in which the postures is maintained before the movement is detected, wherein the operation of adjusting may include an operation of adjusting, based on the oxygen saturation reference value, the oxygen saturation value obtained during the period in which the posture is maintained before the movement is detected and stored in the buffer if the movement greater than or equal to the predetermined value is detected.

According to various embodiments, the method may further include an operation of storing, in the buffer, the oxygen saturation value obtained via the second sensor after the movement greater than or equal to the predetermined value is detected.

According to various embodiments, the operation of adjusting may include an operation of obtaining the maximum value of the oxygen saturation value obtained during the period in which the posture is maintained before the movement is detected, and an operation of adjusting, based on the difference between the maximum value and the oxygen saturation reference value, the oxygen saturation value obtained during the period in which the posture is maintained before the movement is detected.

According to various embodiments, the oxygen saturation reference value may be the maximum value of an oxygen saturation value measured in advance in a stable state.

According to various embodiments, the method may further include an operation of disregarding the oxygen saturation value obtained during the period in which the posture is maintained before the movement is detected if the period in which the posture is maintained before the movement is detected is less than the predetermined period.

According to various embodiments, an electronic device may include a communication module, a memory, and at least one processor operatively connected to the communication module and the memory, wherein the at least one processor may be configured to identify whether the period in which a posture is maintained before a movement is detected is greater than or equal to a predetermined period if the movement of an external electronic device that is greater than or equal to a predetermined value is identified based on a sensing value received from the external electronic device via the communication module, to obtain an oxygen saturation reference value stored in the memory if the period in which the posture is maintained before the movement is detected is greater than or equal to the predetermined period, and to adjust, based on the oxygen saturation reference value, an oxygen saturation value received from the external electronic device during the period in which the posture is maintained before the movement is detected.

According to various embodiments, the at least one processor is configured to increase a posture index stored in the memory if the movement of the external electronic device that is greater than or equal to the predetermined value is identified, and to maintain the increased posture index even when the movement of the external electronic device greater than or equal to the predetermined value is detected during a predetermined period after the posture index is increased.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device which is wearable by a user, the electronic device comprising:
   a first sensor configured to detect a movement of the electronic device;
   a second sensor configured to measure an oxygen saturation;
   memory storing instructions; and
   at least one processor operatively connected to the first sensor, the second sensor, and the memory,
   wherein the instructions, when executed by the at least one processor, cause the electronic device to:
      in response to the movement of the electronic device over time greater than or equal to a predetermined value being detected via the first sensor, determine whether a period before the movement is detected in which a posture of the user wearing the electronic device is maintained is greater than or equal to a predetermined period, based the detected movement of the electronic device;
      based on a determination that the period is greater than or equal to the predetermined period, identify an oxygen saturation reference value stored in the memory; and
      adjust, based on the oxygen saturation reference value, an oxygen saturation value obtained via the second sensor during the period.

2. The electronic device of claim 1, wherein the instructions, when executed by the at least one processor, cause the electronic device to:
   obtain a first sensing value based on an orthogonal coordinate system via the first sensor;
   obtain a second sensing value based on a spherical coordinate system by converting the first sensing value; and
   based on a change in the second sensing value based on the spherical coordinate system being greater than or equal to the predetermined value, detect the change as the movement greater than or equal to the predetermined value.

3. The electronic device of claim 1, wherein the instructions, when executed by the at least one processor, cause the electronic device to:
   in response to detecting the movement greater than or equal to the predetermined value, increase an index corresponding to the posture stored in the memory; and
   maintain the increased index when the movement greater than or equal to the predetermined value is detected during a predetermined period after the posture index is increased.

4. The electronic device of claim 1, wherein the predetermined period is a minimum period among a plurality of periods, in which a difference between a maximum value of an oxygen saturation value measured in each of the plurality of periods, and the oxygen saturation reference value is within a predetermined range, and
   wherein at least one period of the plurality of periods has a different length than other periods of the plurality of periods.

5. The electronic device of claim 1, wherein the memory comprises a buffer, and
   wherein the instructions, when executed by the at least one processor, cause the electronic device to:
   store, in the buffer, the oxygen saturation value obtained during the period; and
   in response to detecting the movement greater than or equal to the predetermined value, adjust, based on the oxygen saturation reference value, the stored oxygen saturation value obtained during the period.

6. The electronic device of claim 5, wherein the instructions, when executed by the at least one processor, cause the electronic device store, in the buffer, another oxygen saturation value obtained via the second sensor after the movement greater than or equal to the predetermined value is detected.

7. The electronic device of claim 1, wherein the instructions, when executed by the at least one processor, cause the electronic device to:
   obtain a maximum value of the oxygen saturation value obtained during the period; and
   adjust, based on a difference between the maximum value and the oxygen saturation reference value, the oxygen saturation value obtained during the period.

8. The electronic device of claim 1, wherein the oxygen saturation reference value is a maximum value of an oxygen saturation value measured in advance in a stable state.

9. The electronic device of claim 1, wherein the instructions, when executed by the at least one processor, cause the electronic device to in response to a determination that the period is less than the predetermined period, disregard the oxygen saturation value obtained during the period in which the posture is maintained before the movement is detected.

10. A method of controlling an electronic device which is wearable by a user, the method comprising:
   in response to detecting, via a first sensor in the electronic device that detects a movement of the electronic device, the movement of the electronic device greater than or equal to a predetermined value, determining whether a period before the movement is detected in which a posture of the user wearing the electronic device is maintained is greater than or equal to a predetermined period, based the detected movement of the electronic device;

based on a determination that the period is greater than or equal to the predetermined period, obtaining an oxygen saturation reference value stored in a memory; and adjusting, based on the oxygen saturation reference value, an oxygen saturation value obtained via a second sensor during the period, wherein the second sensor measures oxygen saturation.

11. The method of claim 10, wherein the determining of whether the period is greater than or equal to the predetermined period, comprises:

obtaining a first sensing value based on an orthogonal coordinate system via the first sensor;

obtaining a second sensing value based on a spherical coordinate system by converting the first sensing value; and based on a change in the sensing value based on the spherical coordinate system being greater than or equal to the predetermined value, detecting the change as the movement greater than or equal to the predetermined value.

12. The method of claim 11, wherein the adjusting comprises:

obtaining a maximum value of the oxygen saturation value obtained during the period; and adjusting, based on a difference between the maximum value and the oxygen saturation reference value, the oxygen saturation value obtained during the period.

13. The method of claim 10, further comprising:

in response to detecting the movement greater than or equal to the predetermined value, increasing an index corresponding to the posture stored in the memory; and maintaining the increased index when the movement greater than or equal to the predetermined value is detected during a predetermined period after the posture index is increased.

14. The method of claim 10, wherein the predetermined period is a minimum period among a plurality of periods, in which a difference between a maximum value of an oxygen saturation value measured in each of the plurality of periods, and the oxygen saturation reference value is within a predetermined range, and wherein at least one period of the plurality of periods has a different length than other periods of the plurality of periods.

15. The method of claim 10, further comprising:

storing, in a buffer included in the memory, the oxygen saturation value obtained during the period;

wherein the adjusting of the oxygen saturation value comprises in response to detecting the movement greater than or equal to the predetermined value, adjusting, based on the oxygen saturation reference value, the stored oxygen saturation value obtained during the period.

16. The method of claim 15, further comprising:

storing, in the buffer, another the oxygen saturation value obtained via the second sensor after the movement greater than or equal to the predetermined value is detected.

17. The method of claim 10, wherein the oxygen saturation reference value is a maximum value of an oxygen saturation value measured in advance in a stable state.

18. The method of claim 10, further comprising:

in response to a determination that the period is less than the predetermined period, disregarding the oxygen saturation value obtained during the period.

19. An electronic device, the electronic device comprising:

a communication circuit;

memory storing instructions; and at least one processor operatively connected to the communication circuit and the memory, wherein the instructions, when executed by the at least one processor, cause the electronic device to:

receive a sensing value corresponding to a movement of an external electronic device, from the external electronic device via the communication circuit;

in response to identifying, based on the received sensing value, the movement of the external electronic device greater than or equal to a predetermined value, determine whether a period before the movement is detected in which a posture of a user wearing the external electronic device is maintained is greater than or equal to a predetermined period, based on the received sensing value;

based on a determination that the period is greater than or equal to the predetermined period, obtain an oxygen saturation reference value stored in the memory; and adjust, based on the oxygen saturation reference value, an oxygen saturation value received from the external electronic device during the period.

20. The electronic device of claim 19, wherein the instructions, when executed by the at least one processor, cause the electronic device:

in response to identifying the movement of the external electronic device that is greater than or equal to the predetermined value, increase an index corresponding to the posture stored in the memory; and maintain the increased index when the movement of the external electronic device greater than or equal to the predetermined value is detected during a predetermined period after the posture index is increased.

* * * * *